United States Patent [19]

Berthold, III

[11] Patent Number: 4,589,286

[45] Date of Patent: May 20, 1986

[54] FUSED SILICA DIAPHRAGM MODULE FOR HIGH TEMPERATURE PRESSURE TRANSDUCERS

[75] Inventor: John W. Berthold, III, Salem, Ohio

[73] Assignee: The Babcock & Wilcox Company, New Orleans, La.

[21] Appl. No.: 595,114

[22] Filed: Mar. 30, 1984

[51] Int. Cl.$^4$ .............................................. G01L 7/08
[52] U.S. Cl. ........................................ 73/715; 73/705; 92/103 R
[58] Field of Search .................. 73/DIG. 4, 715, 727, 73/719, 721, 705; 338/4, 42; 92/103 R, 103 SD; 310/338; 250/231 P, 352

[56] References Cited

U.S. PATENT DOCUMENTS

| | | | |
|---|---|---|---|
| Re. 29,867 | 12/1978 | Stedman | 73/719 |
| 3,040,583 | 6/1962 | Post | 73/705 |
| 3,503,116 | 3/1970 | Strack | 73/705 |
| 3,590,640 | 7/1971 | Cindrick | 73/705 |

FOREIGN PATENT DOCUMENTS 2102941 2/1983 United Kingdom ................. 73/705

Primary Examiner—Donald O. Woodiel
Attorney, Agent, or Firm—Vytas R. Matas; Robert J. Edwards

[57] ABSTRACT

A high temperature pressure transducer and sensing apparatus to determine the deflection of the transducer diaphragm is disclosed. The pressure transducer utilizes a fused silica diaphragm (12) which is illuminated at selected locations by a coherent laser source (52) via optical fibers (38, 46). The light reflected by the diaphragm (12) forms interference fringe patterns which are focused by gradient index rod lenses (36) on the ends of optical fibers (40, 48) for transmission to a fringe counting circuit (54). By digital techniques, the fringe count is converted into a determination of diaphragm deflection.

3 Claims, 1 Drawing Figure

U.S. Patent     May 20, 1986     4,589,286
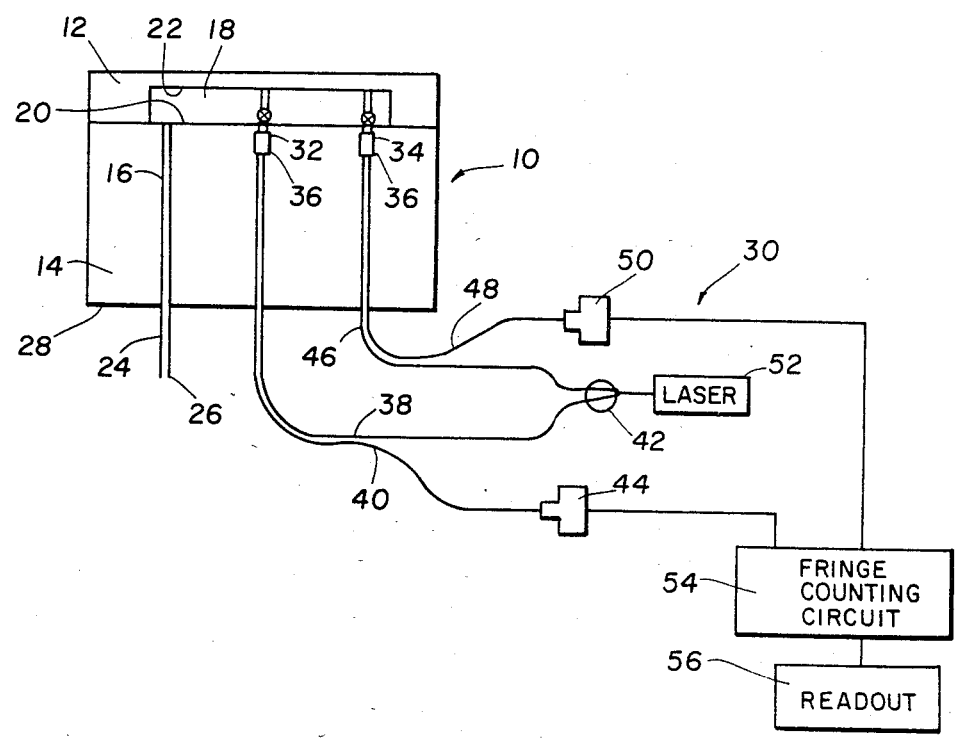

FUSED SILICA DIAPHRAGM MODULE FOR HIGH TEMPERATURE PRESSURE TRANSDUCERS

The invention described herein was made in the performance of work under NASA Contract No. NAS 3-23712 and is subject to the provisions of Section 305 of the National Aeronautics and Space Act of 1958 (72 Stat. 435; 42 U.S.C. 2457).

TECHNICAL FIELD

The present invention relates to high temperature pressure transducers, and more particularly to a high temperature pressure transducer that utilizes a fused silica diaphragm and associated fiber optic sensing apparatus to determine the deflection of the diaphragm.

BACKGROUND ART

Accurate pressure measurements in high temperature applications, such as in the gas path of an aircraft engine, are required in order to monitor and improve the fuel efficiency, performance, and reliability of the engine. Gas path pressure measurements in severe environments have traditionally been performed through the measurement of the deflection of metallic diaphragms. The resulting mechanical deflection of the diaphragm is converted into an electrical signal by several approaches. One method utilizes a resistive strain gage mounted to the center of the diaphragm. Another method utilizes the change in capacitance between the moving diaphragm and a fixed reference surface. Both of these approaches produce acceptable results at relatively low temperatures, however, at temperatures in excess of 500° C., the creep of the metallic diaphragm accelerates which results in a long-term drift of the pressure transducer output signal versus pressure calibration curve. In addition, it has been found that hysteresis in this calibration curve may become significant when these pressure transducers are operated at these high temperatures.

In order to reduce or eliminate the undesirable creep and hysteresis effects exhibited by metallic diaphragms at high temperatures, alternate diaphragm materials with improved high-temperature properties must be utilized. For example, various types of glasses and glass ceramics have excellent dimensional stability and these materials can replace metal as the material for pressure transducer diaphragms. Unfortunately, the hardness and rigidity of these materials, along with their inherent brittleness, dictate a diaphragm design that results in a smaller deflection with pressure than the deflection achievable with metallic diaphragms. These smaller deflections, in turn, necessitate the use of sensing techniques having significantly increased sensitivity so that the deflections can be measured. Such icreased sensitivity allows the measurements to be affected by dynamic vibration and temperature changes which may result in inaccurate measurements of diaphragm deflection.

Because of this, it has become desirable to develop a diaphragm-type pressure transducer and associated diaphragm deflection sensing apparatus that can be used in a high temperature environment, is sensitive to relatively small diaphragm deflections, and is unaffected by dynamic vibration and temperature changes.

SUMMARY OF THE INVENTION

The present invention solves the aforementioned problems associated with the prior art and other problems, by providing a fused silica diaphragm assembly and associated fiber optic diaphragm deflection detecting apparatus. The diaphragm assembly is comprised of a fused silica diaphragm optically contacted to a fused silica platform. A first pair of transmit and receive optical fibers is positioned in the center of the gap between the diaphragm and the platform and a second pair of transmit and receive optical fibers is similarly terminated in the gap but is offset from the first pair. A coherent laser source illuminates the bottom surface of the diaphragm via both transmit optical fibers. The light reflected by the bottom surface of the diaphragm causes an interference fringe pattern to be created which is intercepted by the receive optical fibers. Through photodetectors and a fringe counting circuit, an interference fringe count is made which, in turn, is utilized to determine the amount of diaphragm deflection.

BRIEF DESCRIPTION OF THE DRAWING

The single FIGURE of the drawing is a front elevation view schematically representing the apparatus of the invention.

DESCRIPTION OF THE PREFERRED EMBODIMENT

Referring now to the drawing where the illustration is for the purpose of describing the preferred embodiment of the present invention, and is not intended to limit the invention hereto, the FIGURE illustrates a modular fused silica diaphragm assembly 10 and associated apparatus 30, shown schematically, to measure diaphragm deflection. The diaphragm assembly 10 is comprised of a fused silica diaphragm 12 optically contacted to a fused silica platform 14. The optical contact between the diaphragm 12 and the platform 14 requires a surface flatness of $\lambda/10$. Such surface flatness can be achieved and results in a true molecular bond between the diaphragm 12 and the platform 14.

The fused silica diaphragm 12 is typically formed from a solid disc which may be drilled or etched to the proper depth to obtain the desired diaphragm thickness. The diaphragm 12 and the platform 14 are formed from identical material, fused silica, and require no external support structure, thus minimizing thermal stresses. The platform 14 has an aperture 16 provided therethrough which terminates in the gap 18 located between the top reference surface 20 of the platform 14 and the bottom reference surface 22 of the diaphragm 12. A quartz tube 24 with a tipoff constriction 26 can be fused to the bottom 28 of the platform 14 to permit the introduction of a reference pressure into the gap 18 through the tube 24 and the aperture 16. After the reference pressure has been introduced into the gap 18, the constriction 26 can be tipped-off to seal the reference pressure port.

The apparatus 30 utilized for measuring diaphragm deflection utilizes a "fringe-counting" technique to measure such deflection. With this apparatus 30, two polished blind bores 32, 34 are provided in the top reference surface 20 of the platform 14. Blind bore 32 is located near the center of the top reference surface 20 and blind bore 34 is positioned adjacent the junction of the top reference surface 20 and the inner edge of the diaphragm 12. A gradient index rod lens 36 is provided in each blind bore 32, 34. A single mode optical fiber 38 and a multimode optical fiber 40 pass through the platform 14 and interconnect the gradient index rod lens 36 provided in the blind bore 32 to a 3 db coupler 42 and a photodetector 44, respectively. Similarly, a single mode optical fiber 46 and a multimode optical fiber 48 pass through the platform 14 and interconnect the gradient index rod lens 36 provided in the blind bore 34 to the 3 db coupler 42 and a photodetector 50. A coherent laser source 52 is connected to the input to the 3 db coupler 42. The outputs of the photodetectors 44, 50 are connected to a fringe counting circuit 54 containing state-of-the-art devices, whose operation will be hereinafter described. The output of the counting circuit 54 is connected to an appropriate readout device 56.

Operationally, light from the laser source 52 is transmitted to the 3 db coupler 42 where it is divided and delivered to the gradient rod index lens 36 provided in each of the blind bores, 32, 34 via the single mode optical fibers 38, 46, respectively. The gradient rod index lenses 36 project collimated light beams onto the bottom reference surface 22 of the diaphragm 12; the collimated light beam emanating from the gradient rod index lens 36 provided in blind bore 32 intercepting the bottom surface of the diaphragm near the center thereof, and the collimated light beam emanating from the gradient rod index lens 36 provided in blind bore 34 intercepting the bottom surface of the diaphragm at a location offset from the center thereof. The foregoing collimated light beams are partially reflected by the bottom reference surface 22 of the diaphragm 12 and the top reference surface 20 of the platform 14 causing the production of interference fringe patterns on each gradient index rod lens 36. These interference fringe patterns are focused by the lenses 36 onto the ends of the multimode optical fibers 40, 48. As the diaphragm 12 deflects, the interference fringe patterns move unidirectionally across the input face of the multimode optical fibers 40, 48. The direction of movement depends upon whether the diaphragm 12 is deflecting toward or away from the top reference surface 20 of the platform 14. The resulting output current of the photodetectors 44, 50 has the same cosine squared time dependence with fringe position as does the spatial light intensity distribution across the fringes.

The fringe counting circuit 54 is comprised primarily of an up/down counting device controlled by logic gates. By the appropriate choice of the trigger threshold, one of the photodetectos 44, 50 can be utilized as an input to the up/down counting device through the logic gates. Each bright-dark fringe pair of the interference fringe pattern is divided into four parts and the logic gates generate digital "high" signals and digital "low" signals which correspond to individual counts having $\lambda/8$ precision, wherein is $\lambda$ is the laser wavelength. The output of the remaining photodetector 44 or 50 is utilized to determine whether the counting device is to add or subtract the signals received from the first photodetector. In order to accomplish the foregoing, the outputs of the photodetectors 44, 50 must be out of phase. The decision to add or subtract the signals from the first photodetector is dependent upon whether the outputs of both photodetectors 44, 50 are simultaneously increasing or decreasing. The up/down counting device thus maintains a running total of the interference fringe count.

The magnitude of the interference fringe count, m, is directly proportional to the deflection, $\Delta h$, of the diaphragm 12 through the following equation:

$$2\Delta h = m\lambda$$

Thus, by digitally determining the fringe count, the deflection of the diaphragm 12 can be sensed and the amount of deflection can be accurately determined. Inasmuch as digital techniques are utilized, no signal conditioning or analog processing is required. In addition, since the interference fringe pattern is formed only at the gradient rod index lenses 36, temperature and/or vibration in the multimode optical fibers 40, 48 cannot affect the fringe pattern Furthermore, relative optical phase shifts induced by the single mode optical fibers 38, 46 become unimportant inasmuch as such phase shifts affect the reflected beams from the bottom reference surface 22 of the diaphragm 12 and the top reference surface 20 of the platform 14 identically. Phase preservation is not required for light to be conducted to the photodetectors 44, 50 via the multimode optical fibers 40, 48 which act as a conduit for the light emanating from a bright fringe or no light from a dark fringe.

Performance-wise, the inherent dynamic range of the foregoing system is high because the fringe count, m, changes in direct proportion to the deflection, $\Delta h$, of the diaphragm 12. The displacement sensitivity of this approach is $\lambda/8$, which for red light corresponds to 0.09 $\mu$m. Assuming the diaphragm 12 has a 40 mm diameter and a 0.6 mm thickness, the minimum detectable pressure which corresponds to the foregoing displacement sensitivity is approximately 3.5 $KP_a$ which is about 0.4% of the maximum allowable full-scale pressure of 690 $KP_a$. Such sensitivity is equivalent to many commercially available strain gage or capacitive pressure transducers, however, such transducers cannot tolerate the significantly higher operating temperatures which have no adverse effect on fused silica devices. And lastly, it should be noted that the fused silica diaphragm assembly 10 is also inherently linear since the deflection of the diaphragm is linear with pressure and the interference fringe order is linear with diaphragm deflection.

Certain modifications and improvements will occur to those skilled in the art upon reading the foregoing description. It will be understood that all such improvements and modifications have been deleted herein for the sake of conciseness and readability, but are properly within the scope of the following claims.

I claim:

1. A high temperature pressure transducer comprising a base member, a diaphragm member connected to said base member, said base member and said diaphragm member being formed from a fused silica material, and a gap located between said base member and said diaphragm member allowing the deflection of said diaphragm member in response to variations in the pressure applied thereto wherein said base member and said diaphragm member are molecularly bonded.

2. The high temperature pressure transducer as defined in claim 1 further including means for introducing a reference pressure in said gap.

3. The high temperature pressure transducer as defined in claim 1 wherein a portion of said diaphragm member is offset from said base member to form said gap located between said base member and said diaphragm member.

* * * * *